United States Patent
Sotobayashi et al.

(10) Patent No.: US 6,912,338 B2
(45) Date of Patent: Jun. 28, 2005

(54) OPTICAL SIGNAL NOISE REDUCTION DEVICE AND METHOD OF REDUCING OPTICAL SIGNAL NOISE

(75) Inventors: Hideyuki Sotobayashi, Tokyo (JP); Wataru Chujo, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 36 days.

(21) Appl. No.: 10/277,159

(22) Filed: Oct. 22, 2002

(65) Prior Publication Data

US 2003/0081890 A1 May 1, 2003

(30) Foreign Application Priority Data

Oct. 30, 2001 (JP) .................................... 2001-332167

(51) Int. Cl.[7] .................................................. G02B 6/28
(52) U.S. Cl. ........................... 385/24; 385/15; 385/16; 385/18
(58) Field of Search ................... 385/15, 16, 18, 385/24, 27, 32, 39, 147

(56) References Cited

U.S. PATENT DOCUMENTS 5,146,517 A * 9/1992 Avramopoulos et al. ...... 385/39
5,911,015 A   6/1999 Bigo ............................. 385/1
6,396,607 B1 * 5/2002 Cao ............................ 398/154
6,445,848 B1 * 9/2002 Islam et al. .................. 385/24
6,453,082 B1 * 9/2002 Watanabe ..................... 385/15

FOREIGN PATENT DOCUMENTS

JP    07-303082    11/1995
JP    09-251175    9/1997

OTHER PUBLICATIONS

Sotobayashi, H, et al., "1.6–b/slHz 6.4–Tb/s QPSK–OCDM/WDM (4 OCDM×40 WDM×40 Gb/S) Transmission Experiment Using Optical Hard Thresholding," IEEE Photonics Technology Letters, vol. 14, No. 4, Apr. 2002, pp. 555–557.

* cited by examiner

*Primary Examiner*—Brian Healy
*Assistant Examiner*—Christopher M. Kalivoda

(57) ABSTRACT

An optical signal noise reduction device and method, where optical control signals are input into a first ring optical fiber, so that optical signals propagates clockwise and counter-clockwise in the optical fiber, with optical control signals propagating either clockwise or counter-clockwise in the first ring optical fiber. Optica signals propagating in the same direction as the optical control signals are affected with cross phase modulation with the optical control signals, while optical signals propagating in the opposite direction as the optical control signals are not affected with cross phase modulation with the optical control signals. The two kinds of the optical signals are then interfered with each other at the optical output to reduce noise of the optical.

8 Claims, 8 Drawing Sheets

FIG. 4A
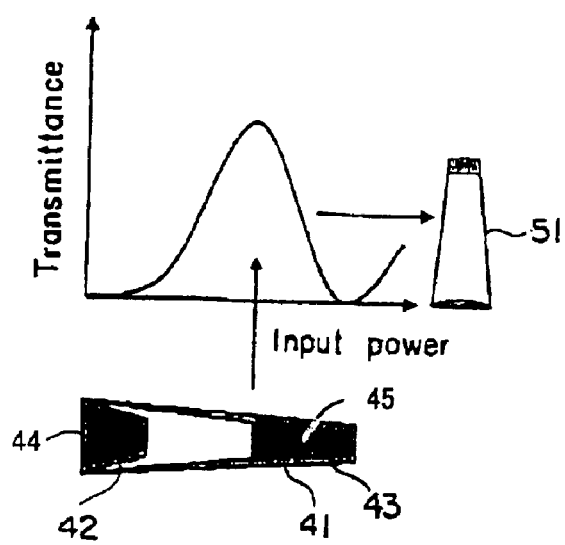
FIG. 4C
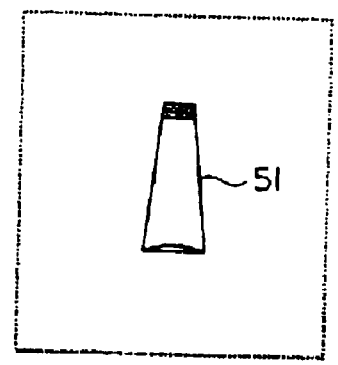
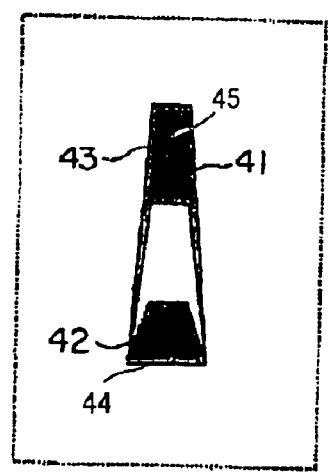
FIG. 4B

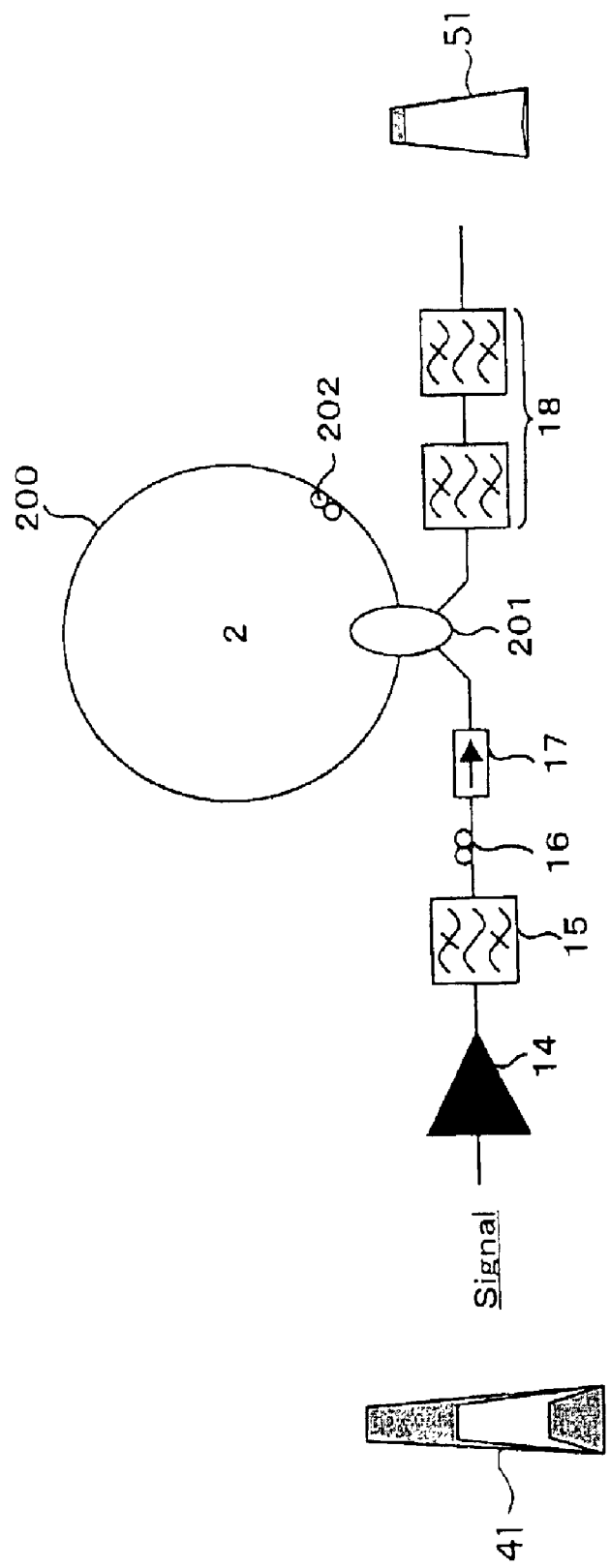

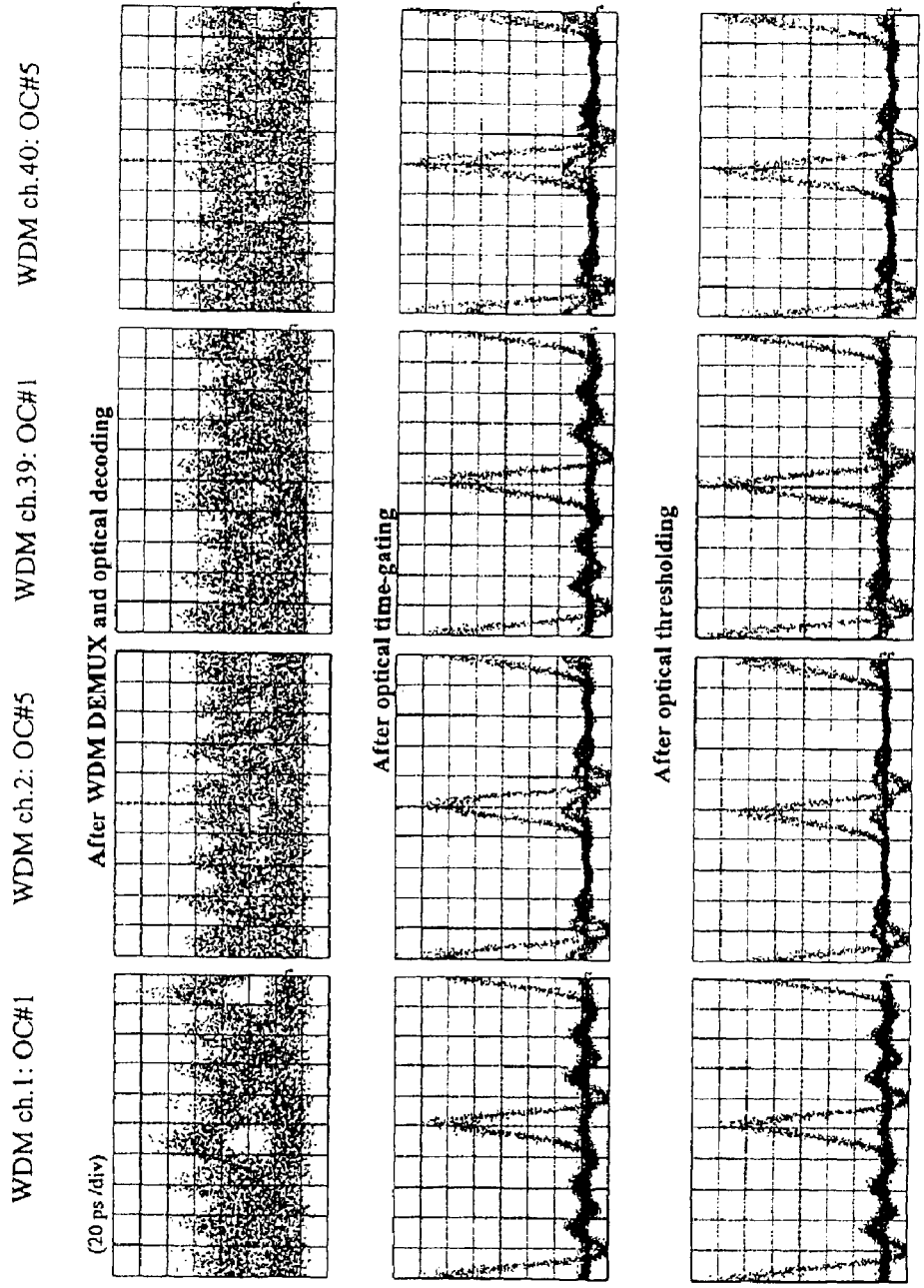

OPTICAL SIGNAL NOISE REDUCTION DEVICE AND METHOD OF REDUCING OPTICAL SIGNAL NOISE

CROSS REFERENCE TO RELATED APPLICATIONS

This application claims priority from Japanese Patent Application No. 2001-332167, filed Oct. 30, 2001 in Japan, the contents of which are incorporated herein by reference.

BACKGROUND OF THE INVENTION

1. Field of the Invention

The present invention relates to an optical signal noise reduction device and a method of reducing optical signal noise. Especially the present invention relates to a device to reduce noise contained in optical binary pulse signals and a method of reducing noise of optical binary pulse signals. The optical signal noise can be reduced in optical processing using the present invention. Communication technique combined with the optical time division multiplex (OTDM) and wavelength division multiplex (WDM) are projected for increasing channel capacity. Optical code division multiplex (OCDM) attracts recently a good deal attention.

The OCDM is a communication system that a transmission site encodes signals with different time domain wave form for each channel, and a receiving site decodes the signals with the same key code. The system has a merit multiplexing many channels in the same time frame with the same wavelength. For developing the optical communication system such as the OCDM, it is needed to ameliorate signal to interference noise ratio for increasing the channel capacity.

2. Description of the Related Art

In prior art, the signal noise of the binary pulse signals is reduced in processing of electric signals transformed from the optical signals. That is, the noise reduction processing has not been carried in processing of optical signals, but the noise reduction process is carried for the electric signals transformed from the optical signals.

The prior art, however, causes a problem that the high-speed of the optical communication is decreased because of the transformation of optical signals to electric signals. Thus, even a new communication system such as the OCDM is adopted to increase the channel capacity, the system has not been employed effectively with the best use.

SUMMARY OF THE INVENTION

The present invention is developed to resolve the problem. An object of the present invention is to provide an optical signal noise reduction device and method of reducing the signal noise which can reduce the optical signal noise in processing the optical signals.

The optical signal noise reduction device of the present invention comprises an optical input means which input optical signals to be processed and optical control signals of the same cycle with the optical signals, a first light guide medium connected to the optical input means and an optical output means outputting the optical signals from the first light guide medium. The optical signals and the optical control signals are input into the first light guide medium so that two kinds of signals are produced. That is, a train of signals with their phases shifted by affection with cross phase modulation with the input optical signals, and another train of signals with their phases not shifted by no affection with the input optical signals. The phase shifted optical signals and the phase no sifted optical signals are interfered each other to eliminate the optical noise.

The optical signal reduction device of the present invention, further, comprises a second light guide medium which is connected to the first light guide medium. The second light guide medium inputs the output signals of the first light guide medium so as to produce two kinds of optical signal trains with different optical intensities. The two kinds of the optical signals in the second light guide medium are interfered each other to reduce the noise of the optical signals output from the first light guide medium. The optical signals their noise is reduced are output from an optical output means connected to the second light guide medium.

The first light guide is a first ring optical fiber, and the optical signals are input so that the optical signals propagates clockwise and counter-clockwise in the optical fiber. The optical control signals are input so that the optical control signals propagates either clockwise or counter-clockwise in the first ring optical fiber.

The optical signals propagating in the same direction with the optical control signals are affected with the cross phase modulation with the optical control signals and the phases of the optical signals are shifted. The optical signals propagating in the different direction with the optical control signals are not affected with the cross phase modulation with the optical control signals and the phases of the optical signals are not shifted. When the optical signals their phases are shifted and the optical signals their phases are not shifted are interfered at the optical output means, the noise of the optical signals are reduced and the optical signals the noise is reduced are output through the optical output means.

The second light guide is composed of a second ring optical fiber. The second ring optical fiber comprises an optical input means connected to the optical out means of the first ring optical fiber. The optical input means of the second ring optical fiber inputs the output signals of the first ring optical fiber so as to produce the two kinds of optical signal trains with different optical intensity each other in the second ring optical fiber. The two kinds of the optical signal trains are interfered each other at an optical output means of the second ring optical fiber to reduce the noise of the optical signals. As mentioned above the optical signal noise is reduced using the optical signal noise device of the present invention.

The method of reducing the optical signal noise is as follows. A first light guide medium inputs optical signals to be processed and optical control signals of the same cycle with the optical signals. The optical signals and the optical control signals are input so as to produce two kinds of trains of the optical signals. That is a train of the optical signals with their phases shifted by affection with cross phase modulation with the input optical control signals, and another train of the optical signals with their phases not shifted by no affection with cross phase modulation with the input optical control signals. The optical signals their phases are shifted and the optical signals their phases are not shifted are interfered to reduce the optical signal noise of the optical signals.

The method of reducing the signal noise, further, comprises the following processing. The output optical signals of the first light guide are input into a second light guide medium. Two kinds of optical signals with different optical intensities are produced in the second light guide from the input optical signals. The two kinds of the optical signals in the second light guide medium are interfered each other to reduce the noise of the optical signals.

In the above mentioned method, the first light guide is a ring optical fiber, and the optical signals are input so that the optical signals propagates clockwise and counter-clockwise in the optical fiber. The optical control signals are input so that the optical control signals propagate either clockwise or counter-clockwise in the first optical fiber.

The optical signals propagating in the same direction with the optical control signals are affected with the cross phase modulation with the optical control signals and the phases of the optical signals are shifted. The optical signals propagating in the different direction with the optical control signals are not affected with the cross phase modulation with the optical control signals and the phases of the optical signals are not shifted. When the optical signals their phases are shifted and the optical signals their signals are not shifted are interfered at the optical output means, the optical signals their noise is reduced are output through the optical output means In the above mentioned method, the second light guide is composed of a second ring optical fiber. The second ring optical fiber comprises an optical input means connected to the optical output means of the first ring optical fiber. The optical input means of the second ring optical fiber inputs the output optical signals of the first ring optical fiber so that the optical signals propagate clockwise and counter-clockwise in the second optical fiber. The optical intensity of the two kinds of clockwise and counter-clockwise optical signals are different each other. The two kinds of the optical signals are interfered at an optical output means of the second ring optical fiber to reduce the optical signal noise.

Using the present invention the optical signal noise can be reduced in the processing of the optical signals. The present invention can be applied to OCDM to increase the channel capacity without losing the merit of high speed signal transmission.

The objects, advantages and features of the present invention will be more clearly understood by referencing the following detailed disclosure and the accompanying drawings.

BRIEF DESCRIPTION OF THE DRAWINGS

FIG. 4A is a drawing explaining action of the second non-linear optical loop mirror switch.

FIG. 4B is an eye pattern of an input signal.

FIG. 4C is an eye pattern of an output optical signal.

FIG. 5 is a drawing explaining the action of the second nonlinear optical loop mirror switch.

FIG. 8A shows an eye diagram of optical pulse signals without processing of the optical pulse signal reduction in accordance with the present invention.

FIG. 8B shows an eye diagram of optical pulse signals being processed with the first optical switch of the optical pulse signal reduction device in accordance with the present invention.

FIG. 8C shows an eye diagram of optical pulse signals being processed with the second optical switch of the optical pulse signal reduction device in accordance with the present invention.

DETAILED DESCRIPTION OF THE PREFERRED EMBODIMENTS

Figure 1:
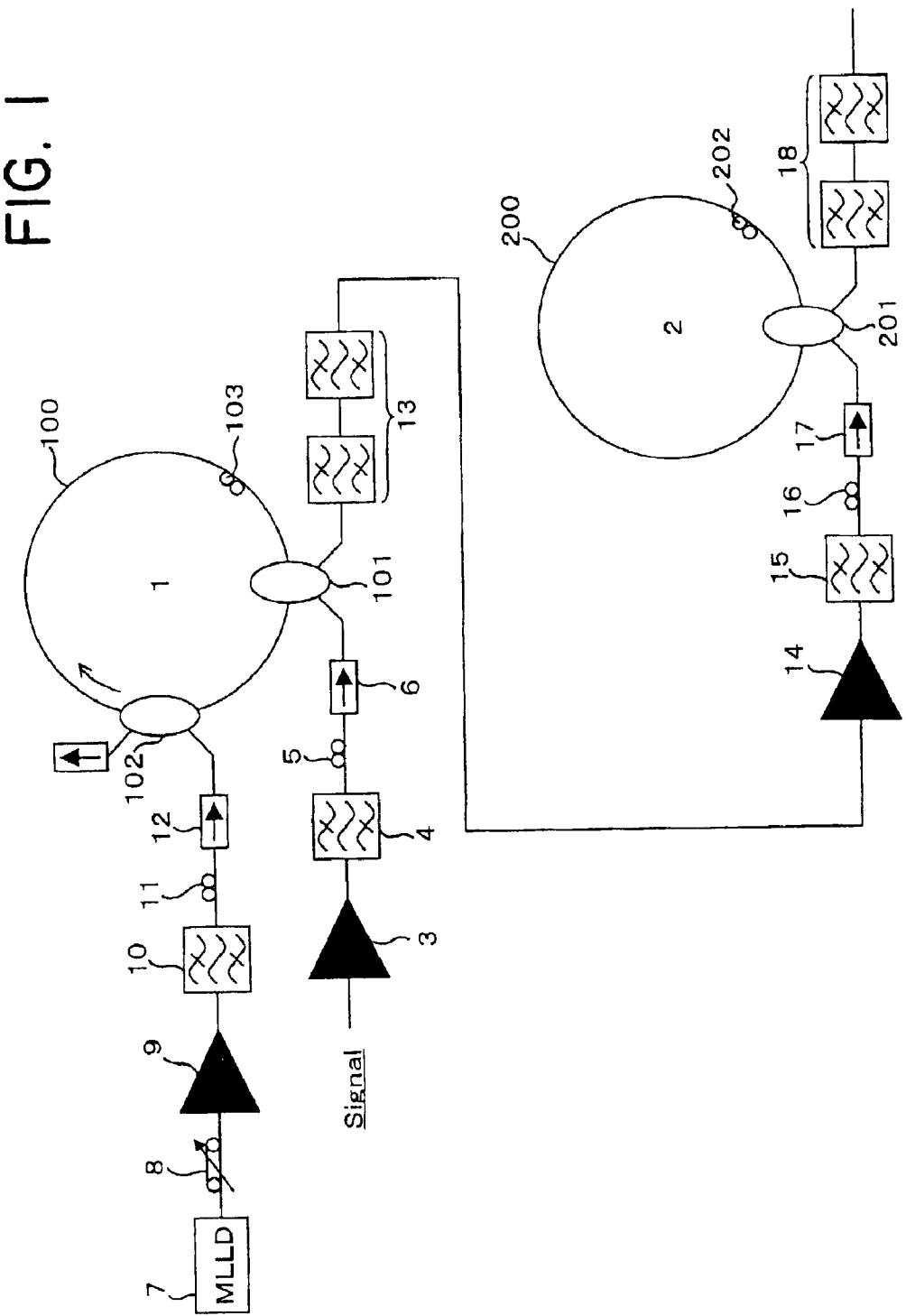
FIG. 1 shows a diagram of the optical signal noise reduction device of the present invention.

The present invention relates to processing optical signals, in the following, however, optical pulse signals are used as an example of the optical signals, and optical control pulse signals is used as the optical control signals. FIG. 1 shows an embodiment of construction of the optical signal noise reduction device. In FIG 1, a first non-linear optical loop mirror switch 1 is a ring optical fiber for the time-gate processing explained later. The first non-linear optical loop mirror switch 1 processes a first noise reduction. The second optical non-linear loop mirror switch 2 is a ring optical fiber for optical threshold processing explained later. The second non-linear optical loop mirror switch 2 processes a second noise reduction. The second optical non-linear loop mirror switch 2 reduces the optical signal noise contained in the output signals from the first optical loop mirror switch 1.

The first optical nonlinear loop mirror switch 1 is composed of a high nonlinear ring optical fiber 100 of length of 100 m comprising an optical coupler 101 of which branching rate is 1:1. The ring fiber 100, further, comprises an optical coupler 102 for introducing the optical control pulse signals, and an optical polarization plane controller 103 to control the optical polarization plane of the optical pulse signals and optical control pulse signals propagating in the optical fiber ring 100. The nonlinearity of the high nonlinear optical fiber is 5–10 times or more than these times that of usual optical fiber. For example the linearity of usual optical fiber is about 2 (1 M/km), but the high nonlinearity is about 21(1/W/km), i.e. 10 times nonlinearity of usual optical fiber.

The second optical loop switch 2 is composed of high nonlinear ring optical fiber 200 of length of 50 m comprising an optical coupler 201 of which branching rate is slightly different from 1:1. The second ring optical fiber switch 2 comprises an optical polarization plane controller 202 for controlling a polarization plane of the optical pulse signals propagating in the ring optical fiber 200.

An optical amplifier 3 inputs optical pulse signals of 40 Gbit/sec of which center wavelength is 1560 nm to amplify the optical pulse signals. A band pass filter 4 inputs the optical signals output from the optical amplifier 3 to pass the optical components of wavelength width of about 4 nm around the center wavelength of the optical pulse signals. The polarization plane controller 5 inputs the optical pulse signal output from the band-pass wave filter 4 to control the polarization plane of the optical pulse signals. The control of the polarization plane of the optical pulse signals improves performance of the first non-linear optical loop mirror switch 1. An isolator 6 inputs the optical pulse signals output from the polarization plane controller 5, and the optical pulse signals passed through the isolator 6 inputs into the optical coupler 101. On the other hand, the optical isolator 6 absorbs the light reflected from the first optical loop mirror switch 1.

A laser diode 7 outputs the optical control pulse signals of 40 GHz with the wavelength of 1543 nm for example. An optical delay line 8 inputs the optical control pulse signals emitted from the laser diode 7, and delays the optical control pulse signals so as to synchronize with the optical pulse signals. An optical amplifier 9 inputs the optical control pulse signals output from the optical delay line 8 to amplify the optical control pulse signals. An optical band-pass filter 10 inputs the optical control pulse signals output from the optical amplifier 9 and passes the components of the wavelength width of 5 nm around the center wavelength of the optical control pulse signal. A polarization plane controller 11 inputs the optical control pulse signals output from the optical band-pass filter 10 to control the polarization plane of the optical control pulse signals. An isolator 12 inputs the optical control pulse signal outputs from the polarization plane controller 11 and output the optical control pulse signals to the optical coupler 102.

An optical band-pass filters 13 are staggered, for example by two stages, and passes the components of wavelength width of about 5 nm around the center wavelength. The optical band path filters 13 filters the optical pulse signals output from the first optical loop mirror switch 1.

An optical amplifier 14 inputs the optical pulse signals output from the optical band-pass filters 13 to amplify the optical pulse signals. An optical band-pass filter 15 inputs the optical pulse signals output from the optical amplifier 14 to pass the components of wavelength width of 5 nm around the center wavelength. A polarization plane controller 16 inputs the optical pulse signals output from the optical band-pass filter 15 to control the polarization plane of the optical pulse signals. The control of polarization plane of the optical pulse signals improves the switching performance of the second optical loop mirror switch 2. An isolator 17 inputs the optical pulse signals output from the polarization controller 16. The isolator 17 passes the optical pulse signals to the optical coupler 201 and absorbs the optical pulse signals reflected from the optical couple 201.

Optical band-pass filters 18 are staggered with two stages for example, and passes the components of wavelength width of about 5 nm around the center wavelength. The optical band-path filters 18 filter the optical pulse signals from the output signals of the first optical loop mirror switch 2.

Figure 2:
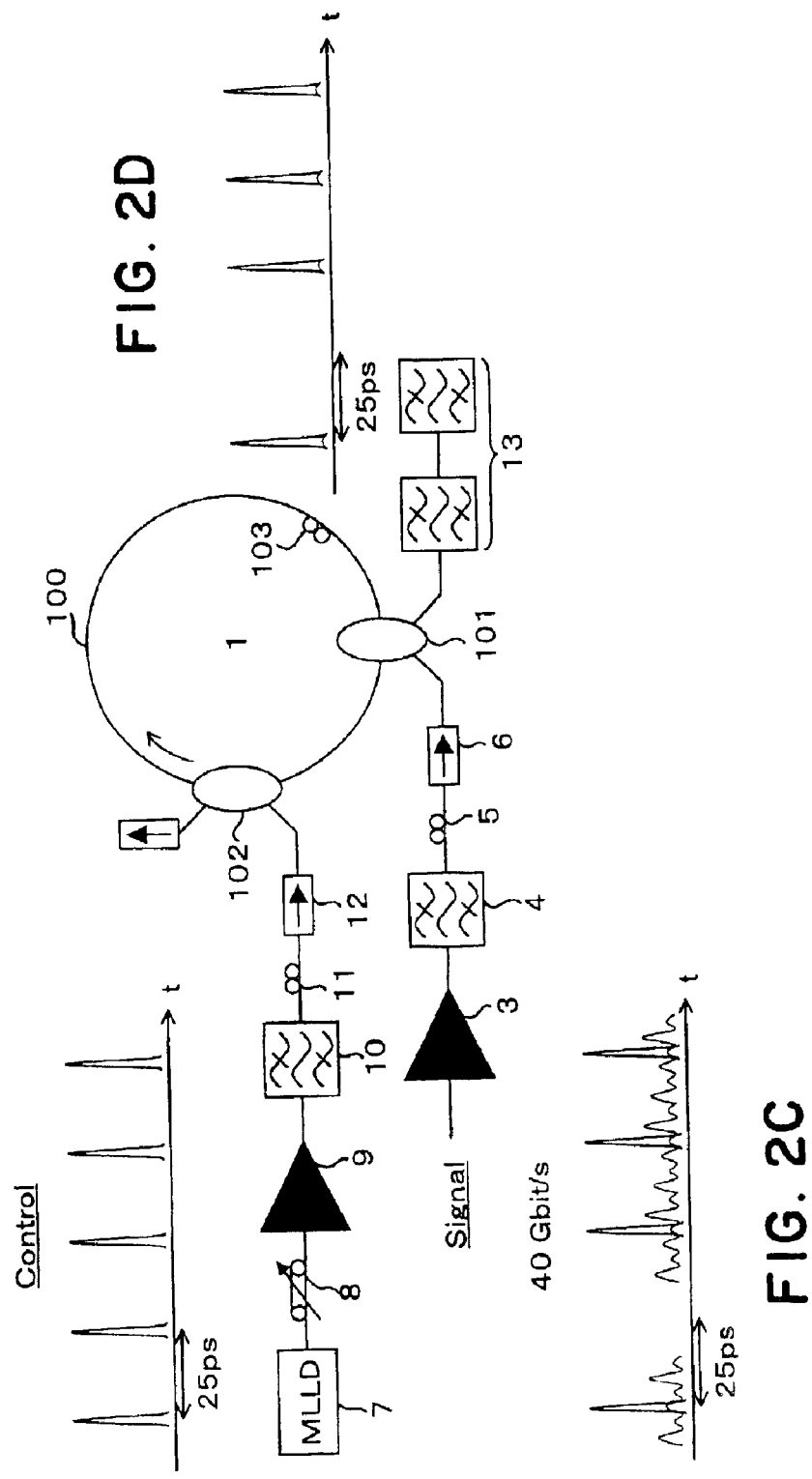
FIG. 2A shows a diagram explaining the action of the optical signal noise reduction device of the present invention.
FIG. 2B shows a train of optical control pulse signals.
FIG. 2C shows a train of input optical pulse signals.
FIG. 2D shows a train of output optical control pulse signals.

The action of the optical signal noise reduction device and method of reducing optical signal noise of the present invention will be explained referring to FIGS. 2A, 2B, 2C, 2D, 3, 4A, 4B, 4C, and 5. FIG. 2A is the optical signal noise reduction device of the present invention which is same with the device shown in FIG. 1. FIG. 2B shows a train of optical control pulse signals. FIG. 2C shows a train of optical pulse signals. FIG. 2D shows a train of output optical control pulse signals. The laser diode 7 emits the optical control pulse signals of 40 GHz, for example, with wavelength of 1542 nm at timing that the optical pulse signals of binary signals of rate of 40 Gbit/sec, for example, with a center wavelength of 1560 nm, enter into the optical amplifier 3. The delay line 8 enters the optical control pulse signals emitted by the laser diode 7, and delays the optical control pulse signals so as to synchronize with the optical pulse signals. The delayed optical control pulse signals are entered into the optical amplifier 9.

The optical control pulse signals with the same bit rate of the optical pulse signals and synchronized with the optical pulse signals can be generated as mentioned above.

The optical pulse signals are input into the optical amplifier 3 to be amplified, filtered by the optical band-pass filter 4, and the polarization plane is controlled by the polarization plane controller 4, and through the isolator 6 input into the optical coupler 101. The optical coupler 101 of branching rate of 1:1 branches the input optical pulse signals in two directions in the ring optical fiber 100 with the same optical intensity. One is the optical pulse signals propagating clockwise and the other optical pulse signals is counter-clockwise.

The optical control pulse signals delayed by the optical delay line 8 are amplified by the optical amplifier 9, filtered by the optical band-pass filter 10. Further their polarization planes are controlled by the polarization plane controller 11, and the optical control pulse signals are input into the optical coupler 102 through the optical isolator 12. The optical control pulse signals are input into the ring optical fiber through the optical coupler 101 to propagate for example clockwise in the ring fiber 100.

The optical pulse signals propagating clockwise in the ring optical fiber 100 are affected with cross phase modulation with the optical control pulse signals propagating clockwise. The phases of the clockwise optical pulse signals change during propagating in the ring fiber 100 up to arrive to the optical coupler 101. On the other hand, the counter-clockwise optical pulse signals in the ring fiber 100 are not affected with the cross phase modulation with the clockwise optical control pulse signals. Thus the phases of the counter-clockwise optical pulse signals do not change during their propagation in the ring optical fiber 100. The clockwise optical pulse signals and counter-clockwise pulse signals are interfered at the optical coupler 101, and the optical pulse signals synchronized with the optical control pulses are switched over to the optical band-pass filters 13 through the coupler 101. The optical pulse signals other than the optical pulse signals output to the optical band-pass filters 13 come back to the optical isolator 6 through the optical coupler 101. The optical pulse signals output through the coupler 101 to the optical band-path filters 13 are the optical pulses which the optical control pulse signals superimpose on the optical pulse signals.

The optical band-pass filters 13 filter the components of the wavelength width of 5 nm around the center of the optical pulse signals from the optical pulses that the optical control pulse signals superimpose on the optical pulse signals. In that filtering process with the band-pass filters 13 the optical pulse signals can be taken out from the optical pulses output from the first optical loop mirror switch 1.

As mentioned above, applying time gate process using the optical control pulse signals shown in FIG. 2B to the optical pulse signal containing noise signals as shown in FIG. 2C, the noise of the optical pulse signals is reduced as shown in FIG. 2D.

The optical pulse signals output from the band-pass filters 13 contain noise in the neighborhood of signal value of 0 and 1, which is not reduced in the above mentioned time gate process at the optical loop mirror switch 1. When decoding optical codes encoded by OCDM, the noise causes a code mismatch between a transmission code and a receiving code.

The optical pulse signals output from the band-pass filters 13 is input to the second optical loop mirror switch 2 through the optical amplifier to reduce the noise in the neighbor hood of the signal value of 0 and 1, therefore.

The optical pulse signals output from the optical band-pass filters 13 are input into the optical amplifier 14 and amplified. The amplified optical pulse signals are filtered by the optical band-path filter 15 further, and the polarization plane of the optical pulse signals are controlled by the polarization controller 16. The optical pulse signals the polarization planes are controlled pass through the optical isolator 17 and input into the ring optical fiber 200 of the second optical loop mirror switch 2 through the optical coupler 201. The coupler 201 has characteristics of the branching rate of slight different with 1:1. Thus the optical pulse signals input to the coupler 201 are branched in two directions with different optical intensity in the ring fiber 200. That is, one of the optical pulse signal trains propagates clockwise in the ring fiber 200 and the other optical pulse signal trains propagate counter-clockwise in the ring fiber 200. Moreover the optical intensity difference of optical pulse signals trains between the clockwise and counter-clockwise optical pulse signals can be caused also by controlling their polarization plane using the polarization controllers 16 and 202 in the optical switch 2 in FIGS. 1, 2A and 5.

Figure 3:
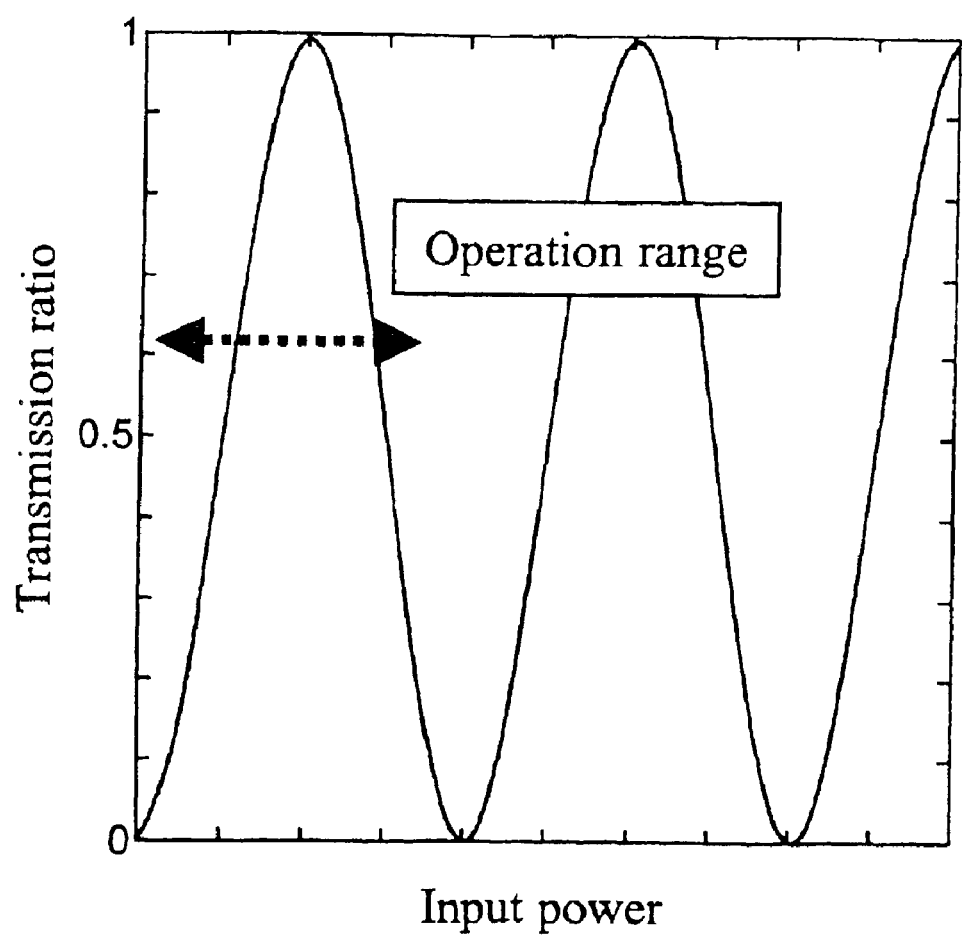
FIG. 3 is a diagram of characteristic of a second non-linear optical loop mirror switch.

Both of clockwise propagating optical pulse signals and counter-clockwise propagating optical pulse signals are propagate in the ring optical fiber 200 changing their phases up to arrive at the optical coupler 201. The amount of phase shift of the optical pulse signals is different between the clockwise optical pulse signals and the counter-clockwise optical pulse signals, because of the difference of their optical intensities. Thus the two kinds of the optical pulse signals interfere each other at the optical coupler 201. For this reason the transmittance of the optical coupler 201 for the optical signals to change according to their optical intensity of the optical pulse signals as shown in FIG. 3.

When an intensity of an input optical pulse signal pulse is 0 signal level, the transmittance is 0, that is perfect reflection. According to the input optical pulse signal increasing, the transmittance becomes greater, that is, the reflection decreases, and at the intensity of the input optical pulse signal of 1 signal level, the transmittance becomes 1, that is, the reflection rate is 0. The intensity of the input optical pulse signal becomes greater further, the transmittance decreases, that is, the reflection rate increases and at an intensity of the input optical pulse signal, the transmittance becomes 0 again, that is, the reflection rate of 1. The periodic characteristic pattern is repeated according to the increase of intensity of the input optical pulse signals.

The second optical loop mirror switch 2 has characteristics that changing rate of the transmittance to the input optical pulse signal intensity change is small in the neighborhood of the transmittance 0. Also changing rate of the transmittance to the the input optical pulse signal intensity change is also small in the neighborhood of the transmittance 1. The characteristics as shown in FIG. 3 is called optical threshold characteristics in the following.

FIG. 4A shows the switching characteristics of the second non-linear loop mirror switch 2. In FIG. 4A the input optical signal 41 input from the optical isolator 17 contains noise 43 in the neighborhood of the maximum signal level "1" 45, and noise 42 in the neighborhood of the minimum level "0" 44 as shown in FIG. 4B. FIG. 4B shows an example of eye pattern containing the noise around the signal level of 0 and 1 caused by some interfered codes, which could not be reduced with the time gate processing in the first optical loop mirror switch 1. When the maximum optical intensity of the optical pulse signal 41 is adjusted to the first maximum transparency 1 of the optical threshold characteristics, the noise 43 around the neighborhood of the maximum signal level 45 and the noise 42 around the minimum signal level 44 minimum signal level can be reduced with the optical threshold characteristics of the optical coupler, as shown in FIG. 4C. FIG. 4C shows the noise around 0 and 1 signal levels caused by the interfered codes is reduced at the 0 and 1 signal levels in the optical processing.

FIG. 5 shows a drawing of the second optical loop mirror switch 2 which reduces the optical signal noise using the optical threshold characteristics. As shown in FIG. 5 when the optical pulse signal 41 containing noise are input through the second optical loop mirror switch 2, and propagate in two directions of clockwise and counter-clockwise with different optical intensity each. The noise is reduced with the interference of the two kinds of optical pulse signals with different optical intensity. The optical pulse signals such as an optical pulse signal 51 that the noise is reduced passes in the direction of the filters 18 through the optical coupler 201.

According to the present invention the noise of the optical pulse signals can be reduced by inputting the optical pulse signals and the optical control pulse signals into the first optical loop mirror switch 1. The optical pulse signal components can be taken out from the first optical loop mirror switch 1 with the time gate processing using the control optical pulse signals to reduce the noise in the optical pulse signals. The optical pulse signals output from the first stage, that is the first optical loop mirror switch 1, is input into the second stage, that is the second optical loop mirror switch 2, to reduce the noise which cannot be reduced by the time gate processing in the first stage. The noise contained in the output optical pulse signals can be reduced in the second optical loop switch 2 by the optical threshold processing. By the processing of two stages, the noise of the optical pulse signals can be reduced finely in the step of optical processing.

Figure 6:
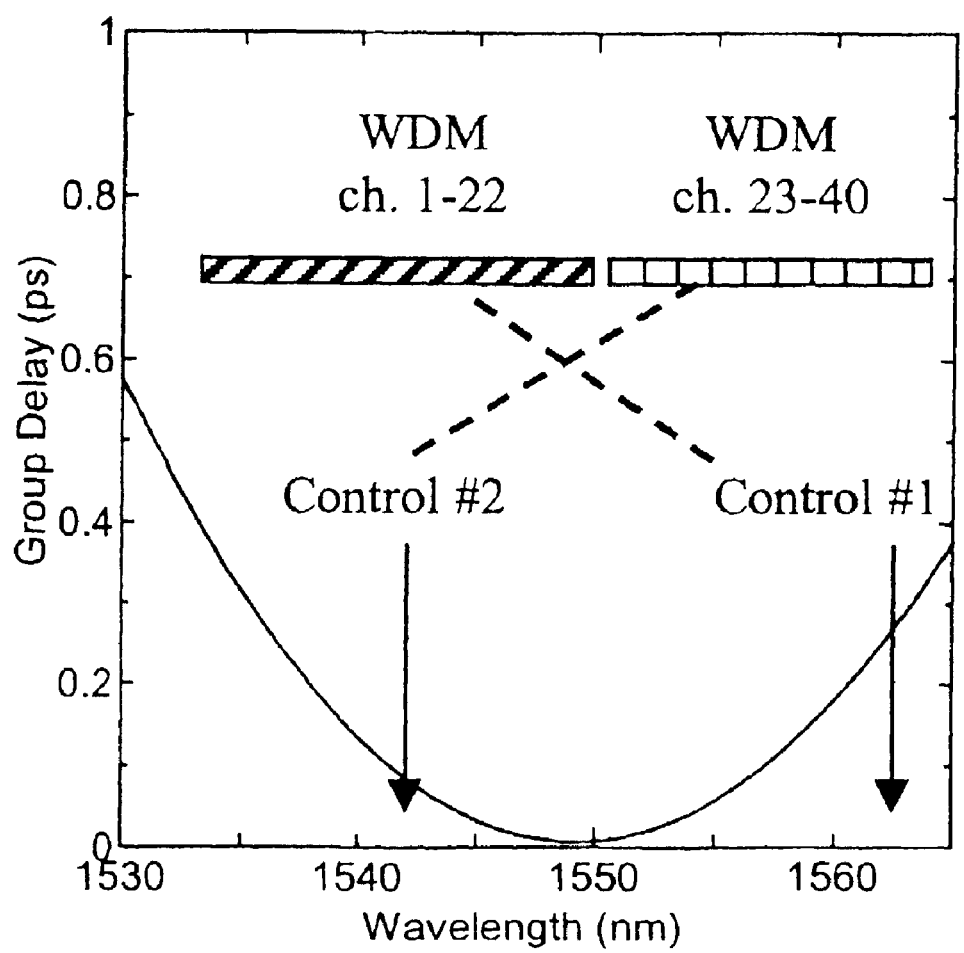
FIG. 6 is a diagram showing a group delay velocity characteristic of the first non-linear optical loop mirror switch.
Figure 7:
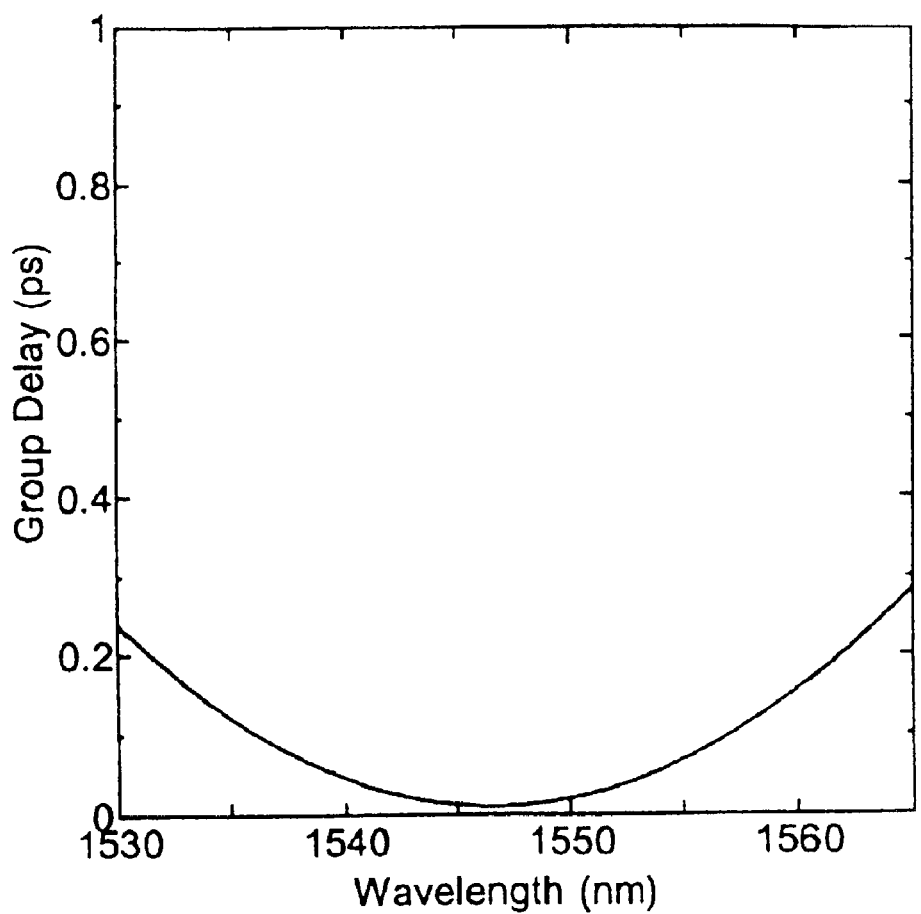
FIG. 7 is a diagram showing a group delay velocity characteristic of the second non-linear optical loop mirror switch.

FIG. 6 shows a relation of wavelength of 1530 nm–1565 nm of the optical pulse signals propagating in the highly non-linear optical fiber of length of 100 m to group delay velocity. FIG. 7 shows a relation of wavelength of 1530 nm–1565 nm of the optical pulse signals propagating in the highly non-linear optical fiber of length of 50 m to group delay velocity. Bit rate of a communication system to which the present invention is applied is limited, because of the deference of the group delay velocity with the wavelength difference.

When constructing a system of channel 1–22 using the optical pulse signals of wavelength of 1533 nm–1550 nm of and the optical control pulse signals of wavelength of 1562 nm, the deference of the group delay velocity between the optical pulse signals and the control pulse signals is +0.15 ps −−0.25 ps, referring to the FIG. 6. Or when constructing a system of channel 23–40 using the optical pulse signals of wavelength of 1551 nm −1564 nm and the optical control pulse signals of wavelength of 1562 nm, the deference of the group delay velocity between the optical pulse signal and the control is +0.25 ps −−0.1 ps.

On the other hand, referring to FIG. 7, the deference of the group delay velocity of wavelength of 1530 nm −1565 nm in an optical fiber of length of 50 m is +0.3 ps–0 ps. For this reason the optical pulse noise reduction device of the present invention can be applied to reduce the noise of the optical pulse signals of bit rate of 40 Gbit/s.

FIG. 8A shows eye diagrams of observed optical pulse signals input into the first optical loop mirror switch 1. FIG. 8B shows eye diagrams of observed optical pulse signals as the result of noise reduction processing to the optical pulse signals shown in FIG. 8A with the time gate processing using the first optical loop mirror switch 1. FIG. 8C shows eye diagrams of observed optical pulse signals as the result of noise reduction processing to the optical pulse signals shown in FIG. 8B with the optical threshold processing using the second optical loop mirror switch 2. The eye diagrams in FIGS. 8A, 8B and 8C show each the experimental results of the channel 1, 2, 39 and 40. The results of these experiments show the noise of the optical pulse signals can be reduced finely using the optical signal reduction device of the present invention.

The present invention is explained by an embodiment above mentioned, however the present invention is not limited to the embodiment. For example, in the above mentioned explanation, an optical gate element, which has characteristics of transparency like FIG. 3 for the optical threshold processing, can be realized by comprising the optical coupler with branching rate of not 1:1 and controlling the polarization plane with the polarization controller 16 and 202. However the optical intensity difference of optical pulse signals trains between the clockwise and counter-clockwise optical pulse signals can be caused either by the optical coupler with branching rate of not 1:1 or by controlling their polarization plane by using the polarization controllers 16 and 202. In addition a first optical loop mirror switch 1 which has an optical coupler 101 with branching rate of not 1:1 can be used instead of the first optical loop mirror switch 1 having an optical couple of branching rate of 1:1.

The many features and advantages of the present invention are apparent from the detailed specification and, thus, it is intended by the appended claims to cover all such features and advantages of the invention which fall within the true spirit and scope of the invention. Further, since numerous modification and changes will readily occur to those skilled in the art, it is not desired to limit the invention to the exact construction and operation illustrated and described, and accordingly all suitable modification and equivalents falling within the scope of the invention may be included in the present invention.

What is claimed is:

1. An optical signal noise reduction device to reduce noise of binary optical signals, comprising:
   a first nonlinear optical loop mirror switch comprising a first optical ring fiber having high nonlinear optical characteristics, a first optical coupler connected to the first optical ring fiber, and a second optical coupler connected to the first optical ring fiber; and
   an optical control pulse generator to generate a train of optical control signals having a pulse repeating frequency the same as a train of pulse signals, with the first optical coupler inputting the train of pulse signals to the first optical ring fiber, and the second optical coupler inputting the train of optical control signals to the first optical ring fiber, wherein the input pulse signals are input into the first optical ring fiber in a propagating direction of clock-wise (CW) and counter-clock-wise (CCW) through the first optical coupler, and the optical control signals are input into the first optical ring fiber in a propagating direction of CW or CCW through the second optical coupler, where the first optical coupler outputs only optical pulse signals that are synchronized with the optical control signals train from the first optical ring fiber; and
   a second non-linear optical loop mirror switch comprising a second optical fiber ring having high nonlinear optical characteristics, a third optical coupler connected to the second optical ring fiber, and an output fiber connected to the third optical coupler,
   wherein the output of the first optical coupler and the input of the third optical coupler are connected to each other,
   wherein the third optical coupler inputs the optical pulse signals, output from the first coupler, into the second optical ring fiber in a propagating direction of CW and CCW, with a coupling rate of the third optical coupler to optical pulses propagating in directions of CW and CCW is slightly different so that an optical transparency of pulses propagating in the directions of CW and CCW at the third coupler are different, and
   wherein in the first nonlinear loop mirror switch noise contained in signals input into the first nonlinear loop mirror switch is reduced with corresponding interference of the optical control signals and the input signals, and noise contained in signals output from the first optical coupler to the third optical coupler is reduced with corresponding interference of signals in a direction of CW and CCW signals in the second nonlinear loop mirror switch, such that the third optical coupler outputs optical signals with reduced noise.

2. The optical signal noise reduction device of claim 1, wherein respective nonlinearities of the first optical ring fiber and the second optical ring fiber are approximately 5 times or more than usual optical fibers.

3. The optical signal noise reduction device of claim 1, further comprising:
   a polarization controller before the third optical coupler; and
   another polarizing controller comprised in the second optical ring fiber,
   wherein optical thresholding characteristics of the second optical loop mirror switch, caused by optical interference of signals in direction of CW and CCW can be changed by changing an optical polarization plane of the polarization controller or the other polarization controller.

4. The optical signal noise reduction device of claim 1, further comprising:
   a first polarization controller, at an input side of the first optical coupler, to control transparent characteristics of input signals;
   a second polarization controller, at an input side of the second optical coupler, to control transparent characteristics of control signals; and
   a third polarization controller inside the first optical ring fiber.

5. The optical signal noise reduction device of claim 1, wherein pulse transmission is greater than 40Gbps.

6. The optical signal noise reduction device of claim 1, wherein a wavelength of the optical signals is approximately between 1533 nm–1565 nm, a wavelength of the optical control signals is approximately a same wavelength as the wavelength of the optical signals, and wherein a difference in group delay between the pulse signals and the optical control signal is less than a group delay of the pulse signals.

7. The optical signal noise reduction device of claim 2, further comprising a second optical gate, to input signals output from the first optical switch, having characteristics of optical transmittance of suppressing noise of optical signals according to optical signal intensity, and outputting optical signals with reduced noise.

8. An optical signal noise reduction method to reduce noise of binary optical signals comprising:
   inputting a train of signals to a first nonlinear optical loop mirror switch, having a first optical ring fiber having high nonlinear optical characteristics, through a first optical couplers;
   generating a train of optical control signals having a pulse repeating frequency the same as the train of signals, a second optical coupler inputting the train of optical control signals to the first optical ring fiber, wherein optical signals are input into the first optical ring fiber in propagating directions of CW and CCW through the first coupler, the optical control pulses are input into the first optical ring fiber in directions of CW or CCW through the second optical coupler, and the first optical coupler outputs only optical pulse signals that are synchronized with pulses of the optical control pulses in the first optical ring fiber; and outputting the optical pulse signals from the first optical coupler to a second non-linear optical loop mirror switch, comprising a second optical fiber ring having high nonlinear optical characteristics, a third optical coupler connected to the second optical ring fiber, with the third optical coupler being connected to the first optical coupler with an optical fiber, and with an output fiber connected to the third optical coupler, wherein the third optical coupler inputs signals output from the first coupler into the second optical ring fiber in propagating directions of CW and CCW, a coupling rate of the third optical coupler to a optical pulse propagating in directions of CW and CCW are slightly different, such that optical transparency of pulses propagating in directions of CW and CCW at the third coupler are different, and wherein in the first nonlinear loop mirror switch noise contained in signals input into the first nonlinear loop mirror switch is reduced with corresponding interference of the optical control signals and the input signals, and noise contained in signals output from the first optical coupler to the third optical coupler is reduced with corresponding interference of signals in a direction of CW and CCW signals in the second nonlinear loop mirror switch, such that the third optical coupler outputs optical signals with reduced noise.

* * * * *

UNITED STATES PATENT AND TRADEMARK OFFICE
CERTIFICATE OF CORRECTION

PATENT NO.        : 6,912,338 B2
APPLICATION NO.   : 10/277159
DATED             : June 28, 2005
INVENTOR(S)       : Hideyuki Sotobayashi et al.

It is certified that error appears in the above-identified patent and that said Letters Patent is hereby corrected as shown below:

Title Page, Item (57) Abstract, Line 6, delete "Optica" and insert -- Optical -- therefor.
Column 10, Line 29, after "CCW" insert -- , --.
Column 10, Line 60, after "signals" insert -- , --.
Column 10, Line 64, delete "couplers;" and insert -- coupler; -- therefor.
Column 12, Line 8, after "switch" insert -- , --.

Signed and Sealed this

Thirteenth Day of February, 2007

JON W. DUDAS
*Director of the United States Patent and Trademark Office*